United States Patent [19]

Wenning

[11] Patent Number: 4,863,586

[45] Date of Patent: Sep. 5, 1989

[54] PROCESS FOR RECOVERY OF LOW-TEMPERATURE CARBONIZATION OIL

[75] Inventor: Hans-Peter Wenning, Raesfeld, Fed. Rep. of Germany

[73] Assignee: Veba Oel Entwicklungs-Gesellschaft mbH, Bundesrepublik, Fed. Rep. of Germany

[21] Appl. No.: 191,017

[22] Filed: May 6, 1988

[30] Foreign Application Priority Data

May 7, 1987 [DE] Fed. Rep. of Germany ....... 3715158

[51] Int. Cl.$^4$ .............................................. C07C 11/04
[52] U.S. Cl. .................................. 208/102; 208/100; 208/127; 208/407; 208/424
[58] Field of Search .............. 208/127, 131, 407, 424, 208/425, 100, 102, 103, 105, 106, 417

[56] References Cited

U.S. PATENT DOCUMENTS

| | | |
|---|---|---|
| 2,776,931 | 1/1957 | Chaney et al. ..................... 208/127 |
| 3,498,906 | 3/1970 | Bogart et al. ....................... 208/131 |
| 3,661,543 | 5/1972 | Saxton ............................. 208/127 X |
| 3,856,675 | 12/1974 | Sze et al. ......................... 208/424 X |
| 4,061,562 | 12/1977 | McKinney et al. ............ 208/127 X |
| 4,388,173 | 6/1983 | Escher et al. ....................... 208/407 |
| 4,404,092 | 9/1983 | Audeh et al. ....................... 208/131 |

*Primary Examiner*—Glenn Caldarola
*Attorney, Agent, or Firm*—Oblon, Spivak, McClelland, Maier & Neustadt

[57] ABSTRACT

In a first condensation stage (which is on the rising current end of the low-temperature carbonization drum and the equipment for which is integrated) quenching is done with a cooled low-temperature carbonization oil fraction containing solids. Simultaneously the whole discharge opening placed on the rising current end in the base region of the low-temperature carbonization drum for the volatile components of the low-temperature carbonization process is continuously scrubbed clean with the low-temperature carbonization oil fraction containing solids. Additionally, the volatile and liquid components are also drawn off simultaneously.

3 Claims, 4 Drawing Sheets

PROCESS FOR RECOVERY OF LOW-TEMPERATURE CARBONIZATION OIL

FIELD OF THE INVENTION

The invention relates to a process for recovery of low-temperature carbonization oil, low-temperature carbonization gas, and low-temperature carbonization coke by carbonization at a temperature of 450° C. to 850° C. from residues containing hydrocarbons.

BACKGROUND OF THE INVENTION

The working up of hydrogenation residues by low-temperature carbonization in an indirectly heated low-temperature carbonization drum is described in "Die katalytische Druckhydrierung von Kohlen, Teeren und Mineraloelen [The Catalytic Pressure Hydrogenation of Coals, Tars, and Crudes Oils]," W. Kroenig, Springer Verlag, Berlin/Goettringen/Heidelberg 1950 (see pages 44 ff., 188 ff., and 252). In the processes disclosed in this treatise, the residue containing carbon is pyrolytically decomposed under suitable conditions into low-temperature carbonization gas, low-temperature carbonization oil, and low-temperature carbonization coke. Fine coke dust is removed from the low-temperature carbonization vapors in a low-temperature carbonization drum. The fine coke dust and the nonvolatile components contained in the residue (such as asphaltenes) form agglomerates that lead to clogging of the low-temperature carbonization vapor outlet. Additionally, the removal of the coke dust leads, with the subsequent condensation, in addition to the uncondensed low-temperature carbonization gas, to the development of low-temperature carbonization oil that has a high solid content.

The condensate obtained with the known processes thus contains considerable amounts of solids and unconverted high molecular substances and cannot be considered a valuable product, since it requires a further expensive working up or must be recycled for repeated low-temperature carbonization in the drum before it can be used.

OBJECT OF THE INVENTION

The object of the invention is to provide, in a process of the type mentioned above, an improved process for recovery of low-temperature carbonization oil without solids and coke with little oil and for avoiding clogging of the low-temperature carbonization vapor outlet.

SUMMARY OF THE INVENTION

According to the invention, the foregoing object is achieved by a process in which, in a first condensation stage (which is on the upstream end of the low-temperature carbonization drum and the equipment for which is integrated) quenching is done with a cooled low-temperature carbonization oil fraction containing solids. Simultaneously the whole discharge opening placed on the upstream end in the base region of the low-temperature carbonization drum for the volatile components of the low-temperature carbonization process is continuously scrubbed clean with the low-temperature carbonization oil fraction containing solids. Finally, the volatile and liquid components are also drawn off simultaneously.

The process described is especially suited for working up crude oil residues from heavy oil hydrogenation and residues from coal hydrogenation and coal tar distillation, but it also may be used to work up sludges mixed with hydrocarbons.

A device for carrying out the process can consist, for example, of a low-temperature carbonization drum with an integrated quenching stage by which the heavy portions of the volatile low-temperature carbonization products are condensed in a first condensation stage.

Preferably, the lowering of the temperature occurs in the first condensation stage to a temperature between 400° C. and 200° C., and the lowering of the temperature occurs in the second condensation stage to a temperature between 50° C. and about ambient temperature.

The low-temperature carbonization vapor outlet of the low-temperature carbonization drum is constantly flushed by recycled low-temperature carbonization oil containing solids. In this way the carbonization vapor outlet is kept free of clogging caused by deposited solids.

Suitably, a flushing of the low-temperature carbonization vapor outlet with a spraying amount of 5 to 25 $m^3/h$ per meter of perimeter of the low-temperature carbonization vapor outlet is provided. In doing so, the low-temperature carbonization oil containing solids from the first condensation stage is fed to a corresponding flushing device. In the space above the flushing zone of the low-temperature carbonization vapor outlet, movable devices can be provided so that the low-temperature carbonization vapor outlet can be kept free of solid deposits.

The uncondensed low-temperature carbonization vapors are separated in the first condensation stage from the entrained solid particles before they are condensed in the second condensation stage, producing low-temperature carbonization oil free of solids at a temperature of about 50° C. down to about ambient temperature. This separation occurs in a preferred configuration of the present process by the suspended solid particles being intensively moistened in a rotating scrubber by addition of recycled low-temperature carbonization oil containing solids and then being separated from the low-temperature carbonization gases and the low-temperature carbonization vapors that are free of solids.

To increase the yield of liquid useful product, the light components still contained in the low-temperature carbonization oil fraction containing solids are separated by stripping with uncondensed low-temperature carbonization gas from the second condensation stage, and the stripping gas laden with stripping product is fed to the second condensation stage.

The stripping gas can be pushed from below by the low-temperature carbonization oil fraction containing solids. The interface between the gaseous phase and the liquid phase is greatly enlarged by the dispersion of the gas phase. This makes possible a good mass transfer into the stripping gas of the light portions contained in the low-temperature carbonization oil fraction containing solids.

According to another configuration of the present process, the stripping gas can also be blown on the surface of the low-temperature carbonization oil fraction containing solids. By a high gas velocity, a good mass transfer is likewise achieved.

The amount of low-temperature carbonization oil containing solids which is recycled as feedstock is determined by a level controller in the stripper.

Depending on the type of feedstock, in another configuration of the present process the separation of the solids in a rotating scrubber can be eliminated if the low-temperature carbonization vapors from the first condensation stage are pushed in the stripper by means of an immersion tube through the liquid column of the heavy low-temperature carbonization oil fraction.

The recycled low-temperature carbonization gas used for stripping can be fed in either cold or reheated. Its temperature and amount establish the condensation temperature and the solids content of the first condensation stage. The object is to minimize the amount of low-temperature carbonization oil fraction containing solids.

In a preferred embodiment, the concentration of the low-temperature carbonization oil containing solids is supported by a mechanical separation of the solids. The low-temperature carbonization gases and the low-temperature carbonization vapors that are free of solids are, for example, separated in a settler by gravity. After homogenization of the remaining low-temperature carbonization oil containing solids, the carbonization oil is partially recycled for use in flushing the low-temperature carbonization vapor outlet. Another part of the low-temperature carbonization oil containing solids is fed to a decanter that separates the low-temperature carbonization oil into a fraction free of solids and a fraction containing solids, and the level of the settler is suitably kept constant by a control loop. In doing so, the solids are enriched to the extent that the mixture remains pumpable and can be pumped back as feedstock. The low-temperature carbonization oil containing solids that remains after concentration preferably has a solids content of 0.1% to 20%.

The remaining low-temperature carbonization oil containing solids is fed to a further working up or recycled into the low-temperature carbonization drum. In the case of recycling in the low-temperature carbonization drum, the remaining low-temperature carbonization oil and the starting materials to be carbonized at low temperatures are first fed to a preheater. To avoid premature cracking reactions, the preheating occurs preferably with addition of hydrogen, steam, a gas containing hydrogen, or a cold low-temperature carbonization gas from the second condensation stage.

According to a further preferred configuration of the invention, the preheating of the feedstock occurs under pressure, and the multiphase mixture of residues to be carbonized at low temperature, recycled low-temperature carbonization oil containing solids, and vapor or gas is released by a valve into the low-temperature carbonization drum.

By recycling the low-temperature carbonization oil containing solids, the discharged coke dust and the high molecular hydrocarbons again reach the low-temperature carbonization drum. In the low-temperature carbonization drum, the coke dust can be recovered quantitatively with the remaining low-temperature carbonization coke, and the residence time of the high molecular compounds is increased.

A portion of the low-temperature carbonization gas from the second condensation stage is fed through a gas heater and next reaches again the indirectly heated low-temperature carbonization drum, where it is used for additional direct heating of the drum contents and for partial lowering of the pressure of the low-temperature carbonization oil vapors. By this technique, a practically oil-free coke is obtained The process according to the invention delivers a low-temperature carbonization coke with little oil, low-temperature carbonization gas, and a middle oil free of solids which can be supplied to standard refinery technology and thus represents a valuable product. For the case where the residues from coal tar distillation are used, the low-temperature carbonization coke obtained can, for example, be used in the aluminum industry as a raw material for the production of electrode coke.

The amount of the low-temperature carbonization oil fraction containing solids that must be fed to a further working up or recycled in the low-temperature carbonization drum is considerably reduced in comparison to the known processes.

DETAILED DESCRIPTION OF THE PRESENTLY PREFERRED EMBODIMENTS

The First Embodiment

Figure 1:
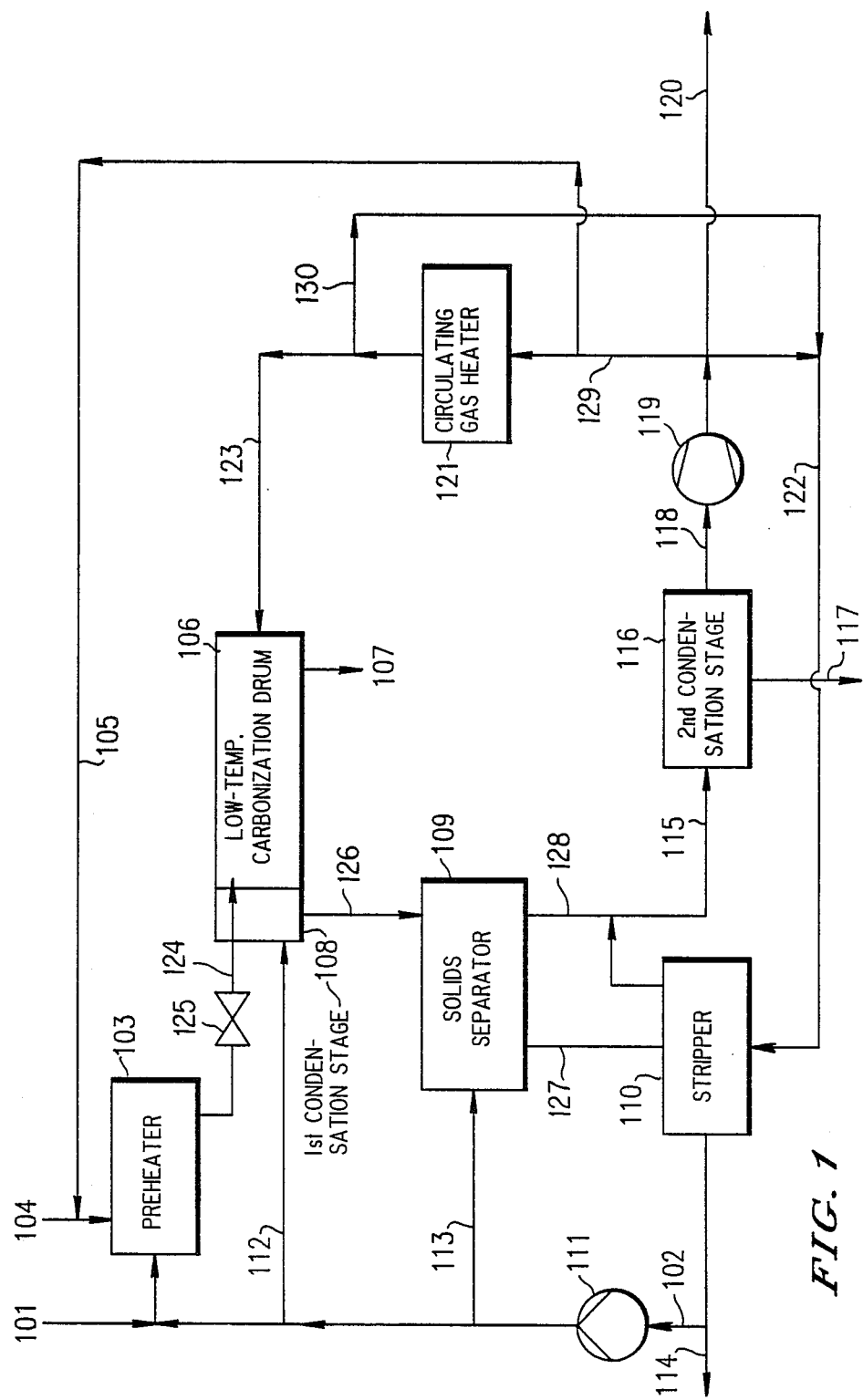
FIG. 1 is a flowchart showing a first embodiment of the invention.

Based on the process flowchart shown in FIG. 1, a first embodiment of the present process will be further explained without limiting the process to this embodiment.

The residue to be carbonized at low temperature enters the process via a pipe 101 and is heated together with the low-temperature carbonization oil containing solids that is recycled by a pipe 102 in a preheater 103. Hydrogen and/or steam is added to the preheater 103 by a pipe 104, and low-temperature carbonization gas is added to the preheater 103 by a pipe 105. The contents of the preheater 103 are fed to a low-temperature carbonization drum 106 via a pipe 124 containing a valve 125. Coke with a little oil is removed from the low-temperature carbonization drum 106 as a product by a pipe 107.

In a first condensation stage 108, the heavy portions of the low-temperature carbonization vapors are condensed out, and the entrained solids are passed via a pipe 126 to a solids separator 109 in which they are scrubbed out. The low-temperature carbonization oil fraction containing solids is passed to a stripper 110 via a pipe 127, and the enriched mixture is recycled from the stripper 110 by the pipe 102, a pump 111, and the preheater 103 into the low-temperature carbonization drum 106. A part of the low-temperature carbonization oil fraction containing solids is sent via a pipe 112 to flush the vapour outlet of the low-temperature carbonization drum 106 and via a pipe 113 to separate the solids out of the low-temperature carbonization vapor in the solids separator 109. The remaining portion of the enriched low-temperature carbonization oil fraction containing solids is removed by a pipe 114.

The light portions of the low-temperature carbonization oil fraction containing solids recovered by stripping in the stripper 110 are fed to a second condensation stage 116 via a pipe 128 together with the stripping gas, the purified low-temperature carbonization gases, and vapors from the first condensation stage 108, which are fed by a pipe 115 to the second condensation stage 116. The low-temperature carbonization water is separated in the second condensation stage 116, and low-temperature carbonization oil free of solids is removed by a pipe 117. The uncondensed low-temperature carbonization gases in the second condensation stage 116 are removed by a pipe 118 and compressed by a fan 119.

A first part of the low-temperature carbonization gas is removed as a product via a pipe 120. A second part of the low-temperature carbonization gas is recycled with reheating via a pipe 129, a circulating gas heater 121, a pipe 130, and a pipe 122 to strip the low-temperature carbonization oil fraction containing solids in the stripper 110. A third part of the low-temperature carbonization gas is recirculated by a pipe 123 and used as stripping gas in the low-temperature carbonization drum 106. A fourth part of the low-temperature carbonization gas is recycled by the pipe 105 and the pipe 104 into the preheater 103.

The Second Embodiment

Figure 2:
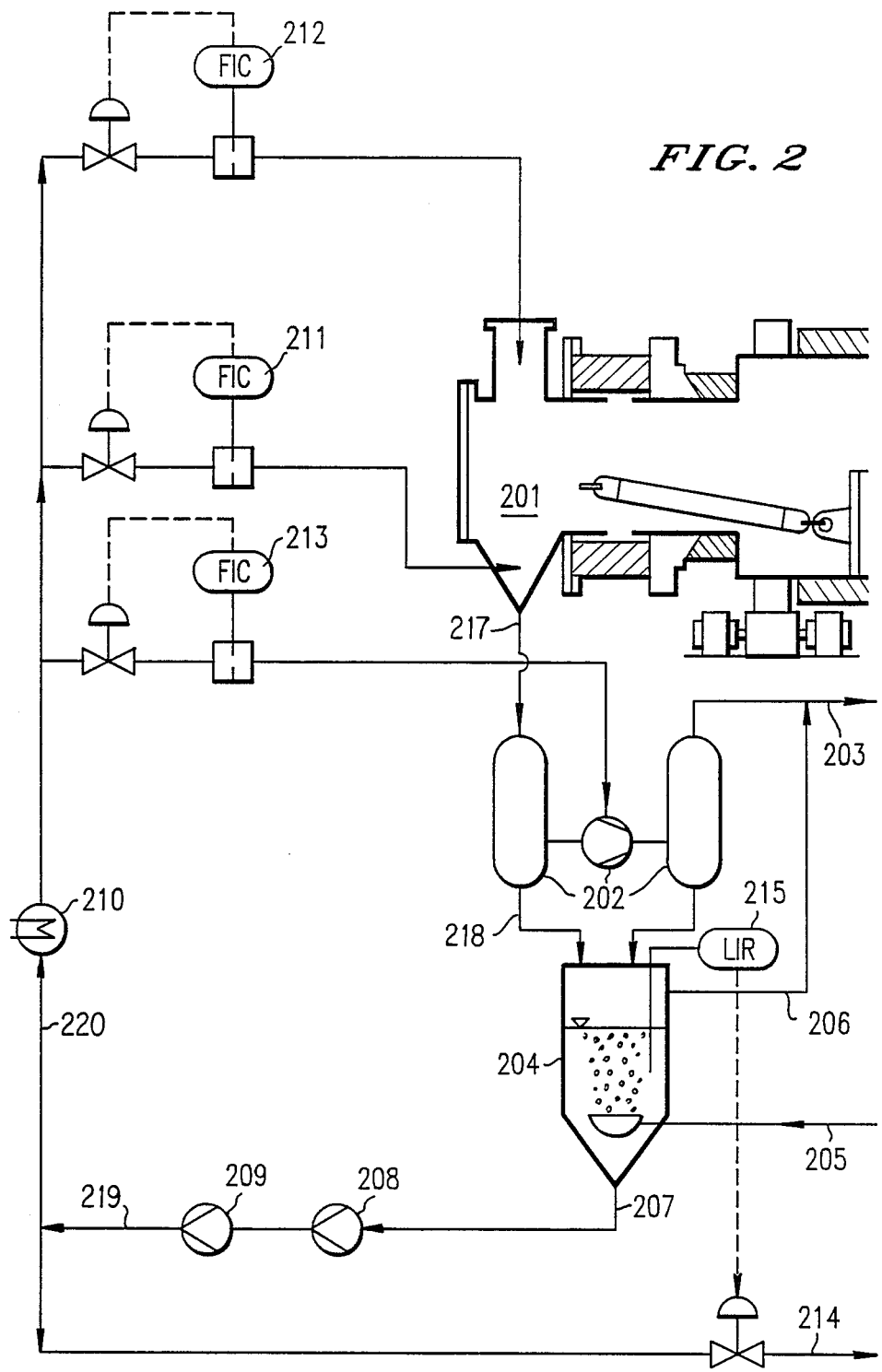
FIG. 2 is a flowchart showing a second embodiment of the invention.

In the second embodiment, shown in FIG. 2, a first condensation stage 201, which is integrated in a low-temperature carbonization drum 216, is connected to a rotating scrubber 202 via a pump 217. The low-temperature carbonization gases and the low-temperature carbonization vapors that are free of solids are separated from the rotating scrubber 202 by a pipe 203.

Next the low-temperature carbonization oil containing solids is passed to a stripper 204 via a pipe 218. As stripping gas, the low-temperature carbonization gas from the second condensation stage (not shown) is charged by a pipe 205. The stripping gas laden with stripping product is passed from the stripper 204 to the second condensation stage via a pipe 206 and the pipe 203. The remaining low-temperature carbonization oil containing solids is transferred by a pipe 207 and a pump 208 to a homogenizer 209. The low-temperature carbonization condensation oil is passed from the homogenizer 209 via a pipe 219 and a pipe 220 to a cooler 210.

Next the low-temperature carbonization oil fraction containing solids is charged by flow control units 211 and 212 for flushing the low-temperature carbonization vapor outlet of the first condensation stage 201 and by a flow control unit 213 as a scrubbing liquid in the rotating scrubber 202. A part of the low-temperature carbonization oil containing solids is recycled by a pipe 214 as a feedstock, and the control of the recycled amount is done by a level control 215.

The Third Embodiment

Figure 3:
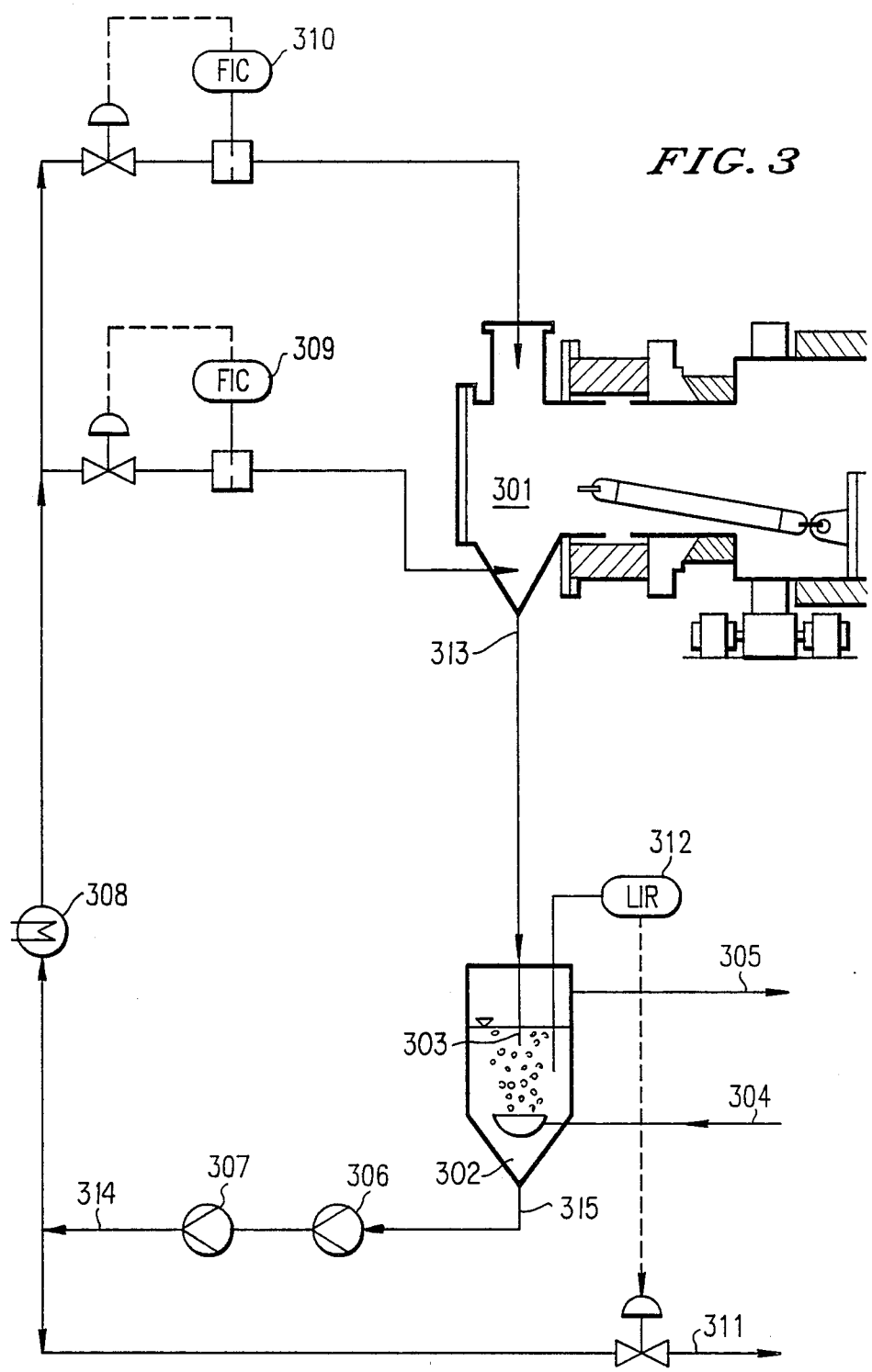
FIG. 3 is a flowchart showing a third embodiment of the invention.

FIG. 3 shows an embodiment in which a stripper 302 is directly connected to a first condensation stage 301 via an immersion pipe 303. The low-temperature carbonization gases and vapors, for solid separation, are pushed by means of the immersion pipe 303 through the low-temperature carbonization oil fraction containing solids. For stripping, the low-temperature carbonization gas from the second condensation stage (not shown) is charged by a pipe 304. The stripping gas loaded with stripping product reaches the second condensation stage together with the low-temperature carbonization gases and vapors that are free of solids by a pipe 305.

The remaining low-temperature carbonization oil containing solids is partially recycled from the stipper 302 via a pipe 313, a pump 306, and a homogenizer 307. From the homogenizer 307, part of the low-temperature carbonization oil containing solids is passed via a pipe 314 to a cooler 308 and from the cooler 308 through the flow control units 309 and 310 for flushing the low-temperature carbonization vapor outlet of the first condensation stage 301. The other part of the low-temperature carbonization oil containing solids is recycled for charging by a pipe 311, and this portion is controlled by a level control 312.

The Fourth Embodiment

Figure 4:
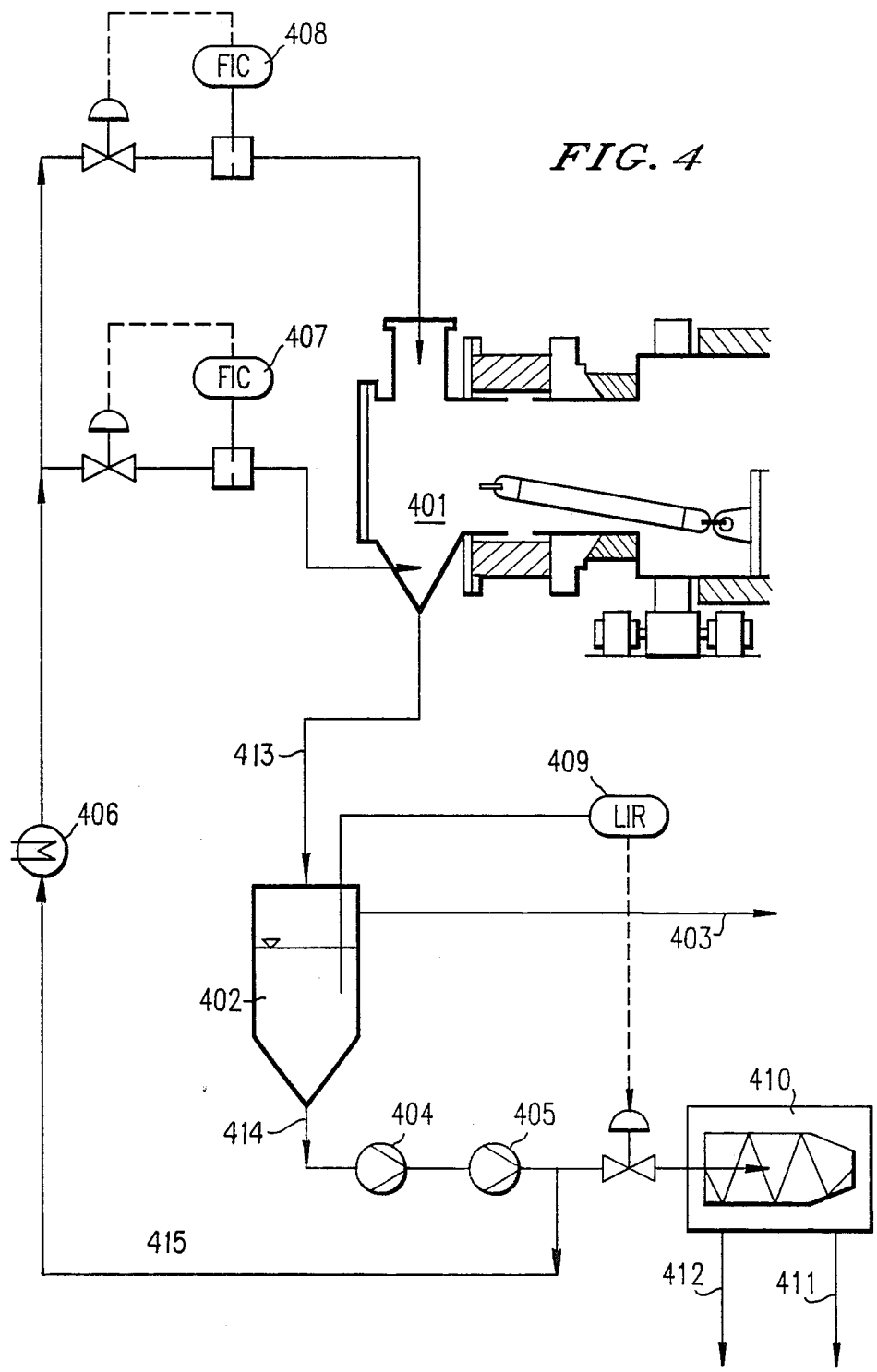
FIG. 4 is a flowchart showing a fourth embodiment of the invention.

FIG. 4 shows an embodiment in which a settling tank 402 is connected to a first condensation stage 401 by a pipe 413. Low-temperature carbonization gases and low-temperature carbonization vapors are removed from the settling tank 402 by a pipe 403. The remaining low-temperature carbonization oil containing solids is transferred by a pipe 414 and a pump 404 to a homogenizer 405.

A part of the low-temperature carbonization oil containing solids is passed via a pipe 415 to a coller 406, after which it is recycled by flow control units 407 and 408 for flushing the low-temperature carbonization vapor outlet in the first condensation stage 401. The remaining low-temperature carbonization oil containing solids is fed, in a manner controlled by a level control 409, to a decanter 410 and separted in the decanter 410 into a fraction containing solids and a fraction free of solids. The fraction containing solids is recycled by a pipe 411 as feedstock, and the low-temperature carbonization oil free of solids is removed by a pipe 412.

EXAMPLE

The process according to the present invention is further illustrated by the following example:

10 t of crude oil residue from hydrogenation of including ash constituents (coke and hydrogenation additives) and 60% by weight of components containing hydrocarbons with 30% by weight asphaltene content and 95% by weight of a portion boiling at 500° C.+, was carbonized at low temperature at a temperature of 550° C. The temperature of the recycled low-temperature carbonization gas used for direct heating of the feedstock in the low-temperature carbonization drum was 650° C. The partial condensation of the higher boiling components of the volatile low-temperature carbonization products occurred in a first condensation stage at 348° C. Next occurred the further separation of the uncondensed components in a following second condensation stage.

The following product composition was obtained:

6.3 t low-temperature carbonization coke with 0.2% by weight oil content;

1.6 t low-temperature carbonization gas having a density of 0.93 kg/m$^3$ (1.013 bar, 0° C.) and a calorific value of 45.1 MJ/m$^3$ (1.013 bar, 0° C.); and 2.1 t low-temperature carbonization oil having a solid content less than 0.1% by weight, 3% by weight asphaltenes, a density of 960 kg/m$^3$ (15° C.), and 15% by weight of portions boiling at 500° C.+.

Obviously, numerous modifications and variations of the present invention are possible in light of the above teachings. It is therefore to be understood that, within the scope of the appended claims, the invention may be practices otherwise than as specifically described herein.

What is claimed as new and desired to be secured by Letters Patent of the United States is:

1. A process for recovery of low-temperature carbonization oil, low-temperature carbonization gas, and low-temperature carbonization coke from residues containing hydrocarbons, to produce a stripped enriched mixture said process comprising the steps of:

(a) introducing the residues containing hydrocarbons, a low-temperature carbonization oil containing solids produced in step (f), and a low-temperature carbonization gas produced in step (p) into a preheater that brings them to a temperature of 450° C. to 850° C; then (b) introducing the contents of the preheater into a rotating low-temperature carbonization drum having a vapor outlet and condensing out the heavy portions of the low-temperature carbonization vapors in the low-temperature carbonization drum;

(c) removing coke and oil as a product from the low-temperature carbonization drum;

(d) passing the entrained solids from the low-temperature carbonization drum to a solids separator in which they are scrubbed out;

(e) passing the low-temperature carbonization oil fraction containing solids from the solids separator to a stripper; to produce a stripped enriched mixture (f) recycling a first portion of the said enriched mixture from the stripper to the preheater;

(g) recycling a second portion of the said enriched mixture from the stripper to flush the vapor outlet of the low-temperature carbonization drum;

(h) recycling a third portion of the said enriched mixture from the stripper to separate the solids out of the low-temperature carbonization vapor in the solids separator;

(i) removing a fourth portion of the enriched mixture from the stripper as a product;

(j) feeding the light portions of the low-temperature carbonization oil fraction containing solids recovered by stripping in the stripper to a condenser;

(k) feeding the stripping gas, the purified low-temperature carbonization gases, and vapor from the rotating low-temperature carbonization drum to the condenser;

(l) removing low-temperature carbonization oil free of solids from the condenser as a product;

(m) removing a first portion of the low-temperature carbonization gas from the condenser as a product;

(n) recycling a second portion of the low-temperature carbonization gas from the condenser to the stripper to strip the low-temperature carbonization oil fraction containing solids in the stripper;

(o) recycling a third portion of the low-temperature carbonization gas from the condenser to the rotating low-temperature carbonization drum, where it is used as a stripping gas; and (p) recycling a fourth portion of the low-temperature carbonization gas from the condenser to the preheater.

2. A process as recited in claim 1 wherein, in step (k) of claim 1, the stripping gas, the purified low-temperature carbonization gas, and the vapor from the rotating low-temperature carbonization drum are fed through the solids separator on the way to the condenser.

3. A process as recited in claim 1 wherein, in step (o) of claim 1, the third portion of the low-temperature carbonization gas from the condenser is fed through a circulating gas heater on the way to the low-temperature carbonization drum.

* * * * *